United States Patent [19]

Mattheyses et al.

[11] Patent Number: 4,910,665
[45] Date of Patent: Mar. 20, 1990

[54] DISTRIBUTED PROCESSING SYSTEM INCLUDING RECONFIGURABLE ELEMENTS

[75] Inventors: Robert M. Mattheyses; Kim P. Gostelow, both of Schenectady, N.Y.

[73] Assignee: General Electric Company, Schenectady, N.Y.

[21] Appl. No.: 902,820

[22] Filed: Sep. 2, 1986

[51] Int. Cl.⁴ .................... G06F 5/00; G06F 15/16
[52] U.S. Cl. ................................................ 364/200
[58] Field of Search ........................... 364/200, 900

[56] References Cited

U.S. PATENT DOCUMENTS

| | | | |
|---|---|---|---|
| 3,106,698 | 10/1963 | Unger | 364/200 |
| 3,287,703 | 11/1966 | Slotnick | 340/172.5 |
| 3,308,436 | 3/1967 | Borck | 364/200 |
| 3,312,943 | 4/1967 | McKindles et al. | 340/172.5 |
| 3,364,472 | 1/1968 | Sloper | 340/172.5 |
| 3,979,728 | 9/1976 | Reddaway | 364/200 |
| 4,314,349 | 2/1982 | Batcher | 364/900 X |
| 4,380,046 | 4/1983 | Fung | 364/200 |
| 4,524,428 | 6/1985 | Grinberg et al. | 364/900 |
| 4,546,428 | 10/1985 | Morton | 364/200 |
| 4,547,898 | 10/1985 | Tsikos | 382/4 |
| 4,739,476 | 4/1988 | Fiduccia | 364/200 |

Primary Examiner—David L. Clark
Attorney, Agent, or Firm—John S. Beulick; James C. Davis, Jr.; Paul R. Webb, II

[57] ABSTRACT

A distributed processing system comprising an array of elements each including a plurality of communication ports on which to send or receive data signals is disclosed. Each element further includes means, under program control, for transposing predetermined ones of the received data signals prior to selection of one data signal for processing. By performing data signal transposition in selected elements in the array, data signal propagation through the array can be arbitrarily controlled.

25 Claims, 8 Drawing Sheets

DISTRIBUTED PROCESSING SYSTEM INCLUDING RECONFIGURABLE ELEMENTS

BACKGROUND OF THE INVENTION

The present invention is directed in general to distributed processing systems and, more specifically, to means for enabling the configuration of the processing elements in a distributed processing system to come under program control.

This application is related to application Ser. No. 761,269, now U.S. Pat. No. 4,739,476, which is commonly assigned and incorporated in its entirety herein by reference.

The distributed processing system disclosed in U.S. Pat. No. 4,739,476 comprises an array of rows and columns of processor cells, referred to herein as processing elements, interconnected to enable communication between each element and its eight nearest neighboring elements. Each processing element includes a plurality of ports having addresses distinct from one another, the plurality of elements having similarly addressed ports. Data transfer operations between the processing elements in the array occur under the control of a controller in accordance with the single instruction multiple data (SIMD) format. The content of a stream of instructions from the controller is determined by the program in accordance with which the distributed processing system is operated. All processing elements in the array are coupled to receive the same instructions from the controller.

During data transfer operations, each element transmits data signals from the one of its ports having a write address identified by the controller instruction. Further, while each element receives data signals from neighboring processors on a plurality of its ports, it selects for signal processing, the signal received on the one of its ports having a read address identified by the controller instruction. As a result, all elements in the system transmit data signals from similarly addressed ports and receive, for processing, data signals on similarly addressed ports. Data transfers therefore occur throughout the array, under program control, in a single uniform direction at any instant. Further, at any instant, data transfers may occur only horizontally along each row, only vertically along each column, or only diagonally.

Thus, for such data transfers as described as described above, the variety of possible configurations of processing elements that may be achieved is generally limited by having to transmit and receive data on similarly addressed ports in all elements. As a result, the elements may only be configured to enable data propagation through the array along a plurality of parallel paths, the paths being either the processing element rows or columns or the diagonal paths formed by the elements. It may be desirable for some computations performed by the distributed processing system, to reconfigure the elements to provide other than the plurality of parallel paths described above. Further, where such a reconfiguration is sought, it would also be desirable to effect such a reconfiguration without the need for physically reconnecting any processors. It is therefore desirable to effect the reconfiguration by program control.

OBJECTS OF THE INVENTION

It is a principal object of the present invention to provide a distributed processing system not subject to the aforementioned problems and disadvantages.

It is another object of the present invention to provide a distributed processing system in which the array of processing elements can be reconfigured.

It is a further object of the present invention to provide a distributed processing system in which the array of processing elements can be reconfigured without the need for physically reconnecting any elements.

It is an additional object of the present invention to provide a processing element, for use in a distributed processing system, adapted to enable the reconfiguration of the element array without the need for physically reconnecting any elements.

SUMMARY OF THE INVENTION

The present invention is directed to a distributed processing system comprising an array of identical processing elements, and a processing element for use in the system, wherein the element array can be reconfigured under program control. Each processing element in the array includes a plurality of communication ports for transmitting and receiving data respectively to and from a plurality of neighboring elements. The ports of each element have addresses distinct from one another, the neighboring elements having similarly addressed ports. Each element in the array is coupled, via its ports, to a plurality of neighboring elements in such a manner that no two ports, of neighboring cells, having similar addresses are coupled to one another. The elements are each responsive to instructions, provided by a system controller, to transmit a data signal over the port having a write address and select for signal processing only the data signal received on the port having a read address, the transmit and receive port addresses being identified in the controller instructions.

Each processing element includes a read multiplexer to which is applied the data signals received on the element communication ports, an output of the multiplexer being directed to an element signal processing means. The read multiplexer is responsive to the read address included in the controller instructions to direct the data signal received on the port having the read address to the signal processing means. Each element further includes means, intermediate selected ones of the ports and the read multiplexer, for transposing the data signals received on the selected ports prior to application to the read multiplexer. The transposing means transposes the received data signals only in elements where it has been preconditioned, under program control, to do so.

In operation, by transposing the data signals received on the selected ports of preselected processing elements only, element configurations enabling data transfers along other than parallel paths through the array can be achieved.

In an alternate embodiment of the present invention, the transposing means is located intermediate the write multiplexer, instead of the read multiplexer, and selected ports.

These and other objects of the invention, together with the features and advantages thereof, will become apparent from the following detailed description when read together with the accompanying drawings in

DESCRIPTION OF THE INVENTION

Figure 1:
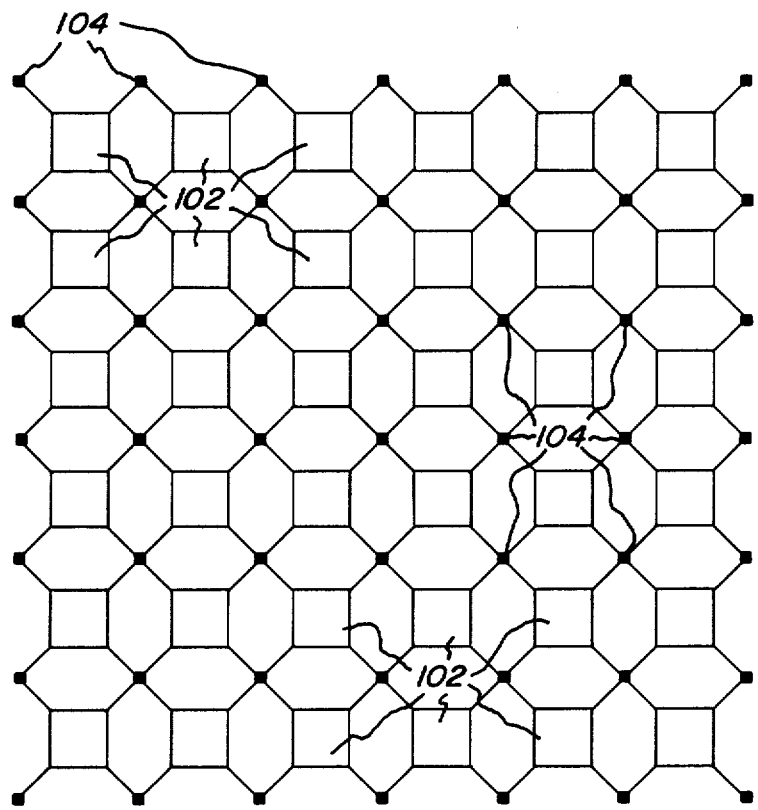
FIG. 1 is a diagrammatic illustration of a parallel processing system.

FIG. 1 illustrates a distributed processing system 100 comprising a plurality of substantially identical processing cells or elements 102 arranged in a rectangular array of rows and columns and interconnected via a plurality of coupling nodes 104. While the elements along each edge of the array may be connected to external devices, in the manner described in the above-incorporated U.S. Pat. No. 4,739,476, in the preferred embodiment of the present invention, the extreme ends of each row are connected together as are the extreme ends of each column of the array. In such a case, the processing elements at the ends of each row share common coupling nodes. Similarly, the processing element at the ends of each column share common coupling nodes. The array, so wrapped in both the horizontal and vertical directions forms a toroidal cellular space. It will be understood by those skilled in the art, that the terms "horizontal" and "vertical" are used in a relative sense herein for purposes of explanation and not in their absolute sense.

Figure 2:
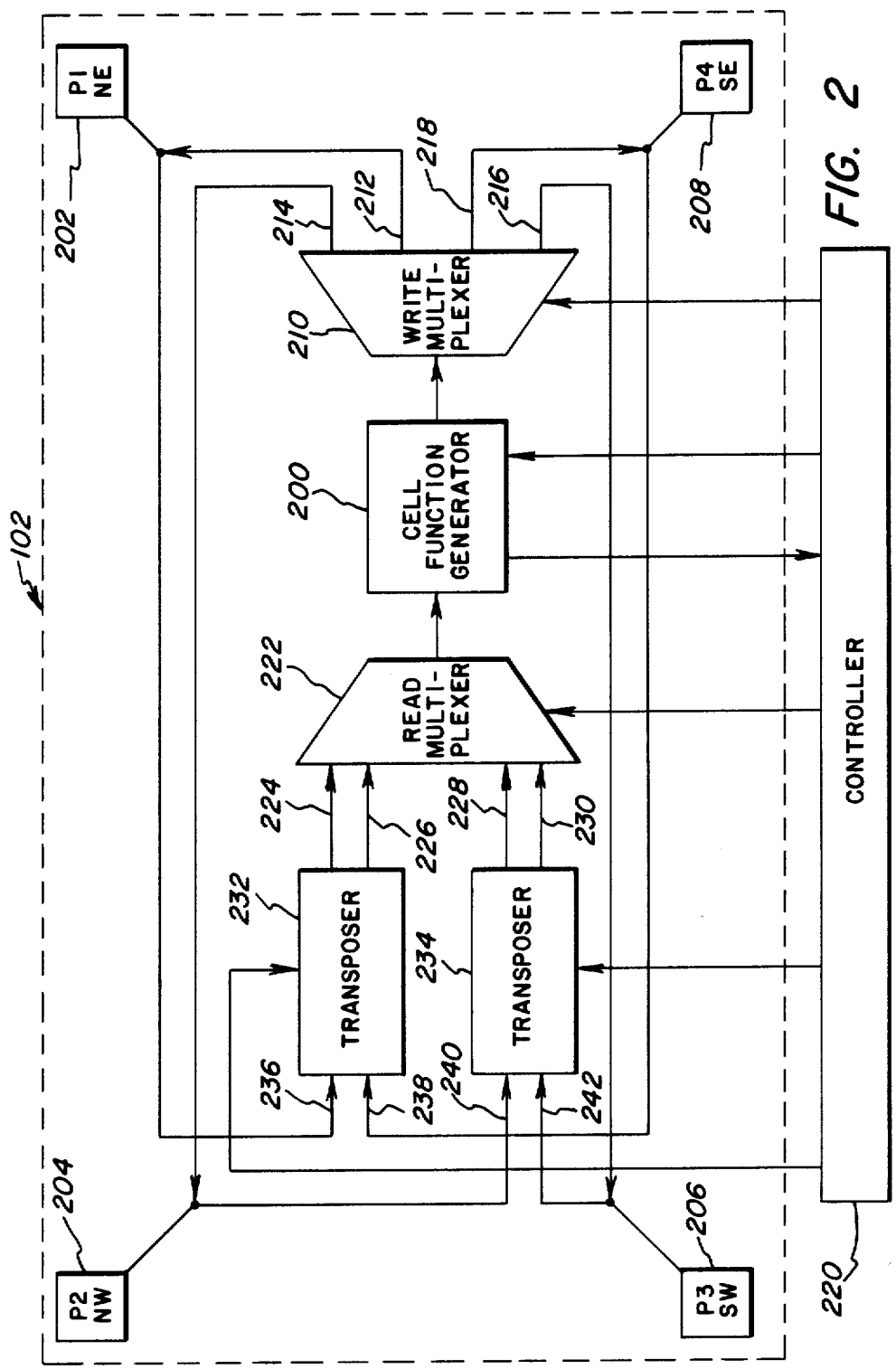
FIG. 2 is an illustrative block diagram of a processing element constructed in accordance with the present invention.

FIG. 2 illustrates the portion of processing element 102 pertinent to the present invention. Element 102 comprises a cell function generator 200 as means for performing the signal processing functions for element 102. Function generator 200 may comprise any means adapted for performing such functions, such as described in U.S. Pat. No. 4,739,476. Function generator 200 receives data signals for processing from, and transmits data signals to, one of a plurality of communication ports 202, 204, 206 and 208. Ports 202, 204, 206 and 208 are assigned the respective port addresses P1, P2, P3 and P4 in U.S. Pat. No. 4,739,476. Solely for the purpose of facilitating description of the present invention, ports 202, 204, 206 and 208 are also respectively assigned herein the geographical designations northeast (NE), northwest (NW), southwest (SW) and southeast (SE). These geographic designations are used in a relative sense herein and not in their absolute sense.

Referring again to FIG. 1, each element in the array is connected to a plurality of neighboring elements by conductive connections to enable communication therebetween. Since elements 102 are substantially identical to one another, each has similarly addressed communication ports. The elements are interconnected in system 100 such that no two ports having similar addresses are coupled together.

Referring again to FIG. 2, system 100 further includes a remote controller 220 coupled to all elements 102 in the array. Controller 220 provides a single set of instruction signals which are identically applied to all elements in the system in accordance with the single instruction multiple data (SIMD) format. Controller 220 performs functions and comprises means substantially as described in U.S. Pat. No. 4,739,476.

Element 102 further includes a write multiplexer 210 coupled to receive the data signal outputs of function generator 200. The write multiplexer includes four outputs 212, 214, 216 and 218 respectively connected to ports 202, 204, 206 and 208. Multiplexer 210 is coupled to controller 220 to receive therefrom a write address, included in the instruction signal, effective to select the address of the port to which function generator 200 is to transmit its output data signal. For example, in order for function generator 200 to transmit a data signal to port 204, the write address applied to multiplexer 210 causes the multiplexer to direct the data signal received from the function generator onto its output 214.

Element 102 additionally includes a read multiplexer 222 having four inputs 224, 226, 228 and 230 for receiving data signals and an output coupled to the function generator. Multiplexer 222 is responsive to a read address included in the instruction signal received from controller 220 to select for signal processing by the function generator, the data signal received on a particular one of its four inputs and to apply that signal to the function generator. Note that while each element may receive data signals on all of its ports, only one of the received signals is selected for signal processing.

The data signals applied to the inputs of multiplexer 222 are those received on any of ports 202, 204, 206 and 208, those data signals being routed to the multiplexer via a first transposer 232 and a second transposer 234. Transposer 232 has inputs 236 and 238 for receiving the data signals received on ports 202 and 208, respectively. Transposer 234 has inputs 240 and 242 for receiving the data signals received on ports 204 and 206, respectively. Each transposer is also coupled to controller 220 to receive a transpose control signal included in the instruction signal.

Figure 3:
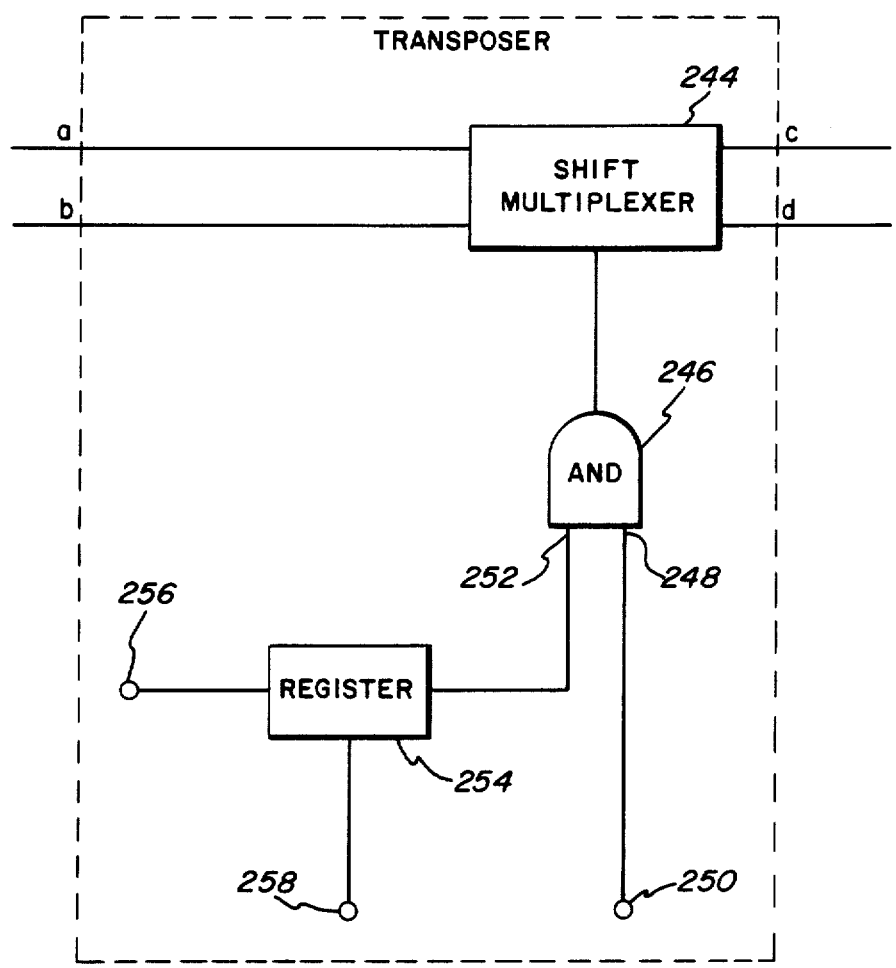
FIG. 3 is an illustrative block diagram of a transposer illustrated in FIG. 2.

FIG. 3 illustrates a preferred construction of a transposer. Transposers 232 and 234 are substantially identically constructed so that the description of the transposer illustrated in FIG. 3 applies equally to both transposers. The inputs of the transposer are designated "a" and "b" while the outputs are designated "c" and "d". Thus, with respect to transposer 232, inputs "a" and "b" are respectively inputs 236 and 238, while with respect to transposer 234, inputs "a" and "b" are, respectively, inputs 240 and 242. Similarly, outputs "c" and "d" are respectively coupled to inputs 224 and 226 of read multiplexer 222 in the case of transposer 232. Outputs "c" and "d" are respectively coupled to read multiplexer inputs 228 and 230 in the case of transposer 234.

The transposer comprises a shift multiplexer 244 coupled to receive data signals on inputs "a" and "b" and provide data signals on outputs "c" and "d". The shift multiplexer is further coupled to receive an output signal of an AND gate 246. The AND gate has an input 248 connected to a terminal 250 for receiving the transpose control signal from controller 220. A second input 252 of the AND gate is connected to receive a signal output of a register 254. The signal held in register 254 is available at AND gate input 252.

Register 254 includes a data terminal 256 on which to receive a preconditioning data signal, e.g., a logic "1" signal, for storage and a control terminal 258 for receiving a load control signal effective to cause register 254 to load the preconditioning signal applied to terminal 256. It is preferred herein that the preconditioning data signal applied to terminal 256 for storage in the register be computed by the function generator of the processing element in which the register is located. Thus, additional data paths, not shown, are provided in each processing element to enable a signal computed by function generator 200 to be selectively applied to register terminal 256 of either transposer 232 or 234. The load signal applied to register control terminal 258 is received in the instruction signal from controller 220 via a connection not shown. Note that while the load signal is applied to all elements in the array, it need only be applied when it is necessary to load preconditioning signals in selected elements. At such time, the preconditioning signal is only loaded in those selected elements in which it has been computed by the function generator.

In the absence of an output signal from AND gate 246, the shift multiplexer provides on its outputs "c" and "d", the data signals respectively applied to its inputs "a" and "b". However, upon receiving the AND gate output signal, the shift multiplexer transposes the data signals applied to its inputs. Thus, with the AND gate output signal applied thereto, shift multiplexer 244 provides on outputs "c" and "d", the data signals respectively applied to inputs "b" and "a". The shift multiplexer may be constructed from any combinational logic that functions in the above-described manner.

Thus, in the case of transposer 232, in the absence of the AND gate output signal, data signals received on ports 202 and 208 are respectively applied to read multiplexer inputs 224 and 226. However, when the shift multiplexer transposes the data signals applied thereto, the data signals received on ports 202 and 208 are respectively applied to read multiplexer inputs 226 and 224. In the case of transposer 234, in the absence of the AND gate output signal, data signals received on ports 204 and 206 are applied to read multiplexer inputs 228 and 230, respectively. When the shift multiplexer of transposer 234 transposes the data signals, the signals received on ports 204 and 206 are instead respectively applied to read multiplexer inputs 230 and 228.

As described above, controller 220 is coupled to all elements 102 in system 100 in substantially the same way. As a result, all elements receive the same control signals, as is characteristic of SIMD operation. Thus, AND gate 246 in each transposer in each element in system 100 receives the transpose control signal on its respective input 248. However, only those AND gates receiving a logic "1" preconditioning signal on their respective inputs 252 provide an output signal, the receipt of that signal on input 252 being possible only if a logic "1" signal is stored in register 254 of the respective transposer. The AND gate output signal may be viewed as the transpose control signal enabled to pass through the gate for application to the shift multiplexer due to the presence of the preconditioning logic "1" signal in the register. Since, as preferred herein, the logic "1" signal is stored only in registers located in elements in which the function generator computed the logic "1" signal, the selection of processing elements in which a shift multiplexer transposes the signals applied thereto, comes under program control. This is possible since, while all elements in processing system 100 receive the same instructions, in accordance with SIMD operation, they operate on different data. As a result, preselected ones of the processing element therein may be provided with appropriate data such that only they compute a logic "1" signal for storage in their respective registers 254 in one or the other transposer. Thus, under program control, one of the two transposers in preselected elements is preconditioned to transpose the data signals applied thereto.

Figure 4:
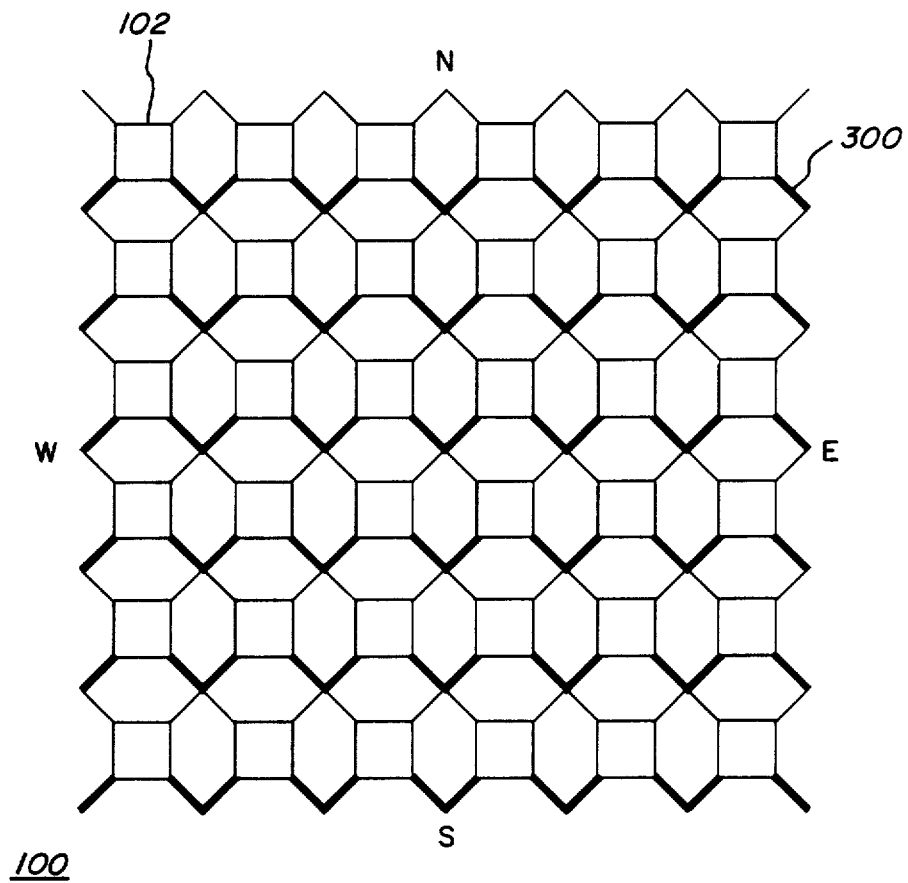
FIG. 4 illustrates data signal propagation through the system illustrated in FIG. 1.

The above-described processing element 102 enables operation of distributed processing system in a manner not previously possible. Referring to FIG. 4, system 100 comprising processing elements 102 is again illustrated. Geographical orientations north (N), south (S), east (E) and west (W) are applied to the edges of the array in the Figure only to facilitate the description hereinbelow of the operation of the present invention. Note, however, as discussed above, system 100 is preferably wrapped to form a toroidal cellular space though it is illustrated as a rectangular array of elements 102. Thus, the east and west edges are joined together at corresponding rows. Similarly, the north and south edges are joined at corresponding columns. Indicated on FIG. 4 are data signal paths 300 shown as bold lines superimposed on the conductive connections between the elements. In the case where the data signals propagate from west to east, each processing element 102 transmits data signals on its southeast port and receives, for signal processing, signals on its southwest port. Similarly, for east to west signal propagation, each element transmits signals on its southwest port and receives, for signal processing, signals on its southeast port. Thus, all elements transmit and receive in an identical manner in response to the instruction signals applied thereto by controller 220. As a result, data signals propagate uniformly along each row.

In order to achieve west to east data signal propagation as illustrated in FIG. 4, transposer 234 performs no transposition and the read address included in the instruction signal applied to all elements in the array is effective to cause read multiplexer 222 to select for signal processing the data signal received on its input 230. The write address included in the instruction signal causes each write multiplexer 210 to direct the data signal received from the function generator onto its output 218. With respect to east to west signal propagation as illustrated in FIG. 4, transposer 232 performs no transposition and the read address causes each multiplexer 222 to select for signal processing the data signal received on its input 226. The write address causes each multiplexer 210 to direct the data signal received from function generator 200 onto its output 216.

Figure 5:
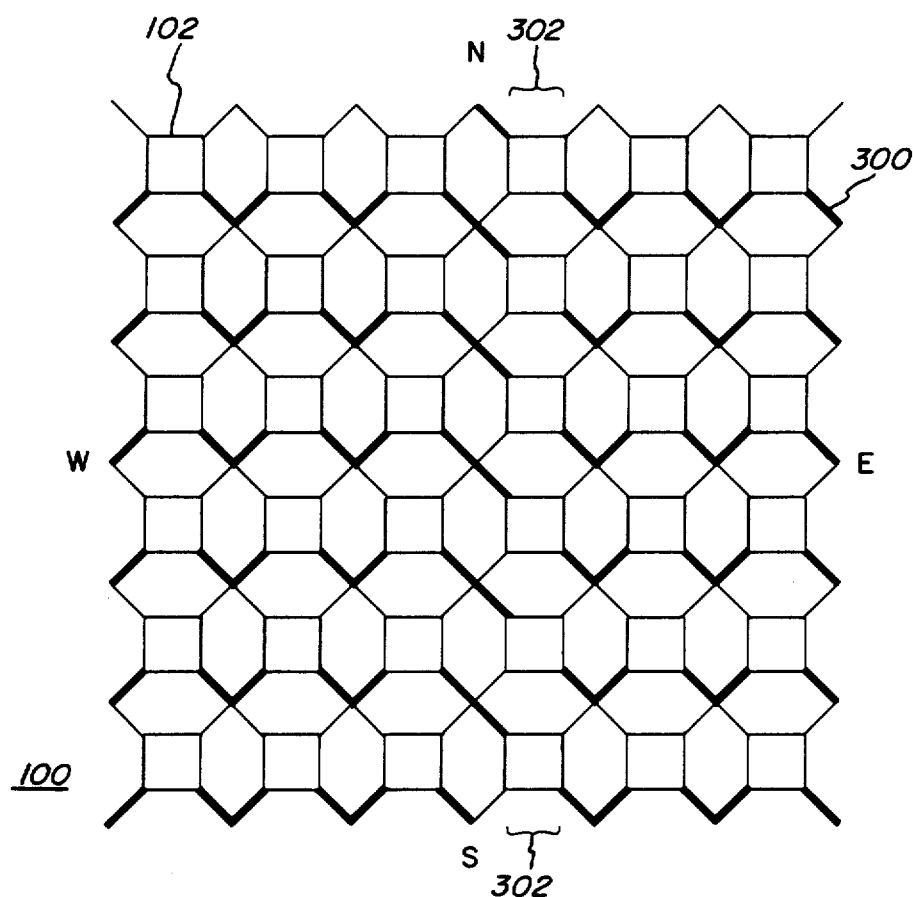
FIGS. 5–7 illustrate different possible configurations of the processing elements, comprising the system illustrated in FIG. 1, achievable in practicing the present invention.

In the operation of the present invention, it is possible to shift the propagation of data signals, illustrated in FIG. 4, from one row to another. Referring to FIG. 5, for west to east signal propagation, the elements in a column 302 of the array each receive data signals on the northwest port rather than the southwest port. As is apparent in FIG. 5, this results in the formation, in the toroidal cellular space, of all the processing elements in the system into a single loop. This is accomplished by preconditioning transposer 234 in each element in column 302 to transpose the data signals applied thereto. The transposers of all other elements in the system are not preconditioned. In all processing elements in the system, the read address included in the instruction signal applied to the read multiplexer requires the multiplexer to select the data signal on its input 230 for application to the function generator. However, while the read multiplexer operates in accordance with the instruction signal, transposer 234 in each element in column 302 applies to input 230 the data signal received on port 204, the northwest port, instead of port 206, the southwest port.

Figure 6:
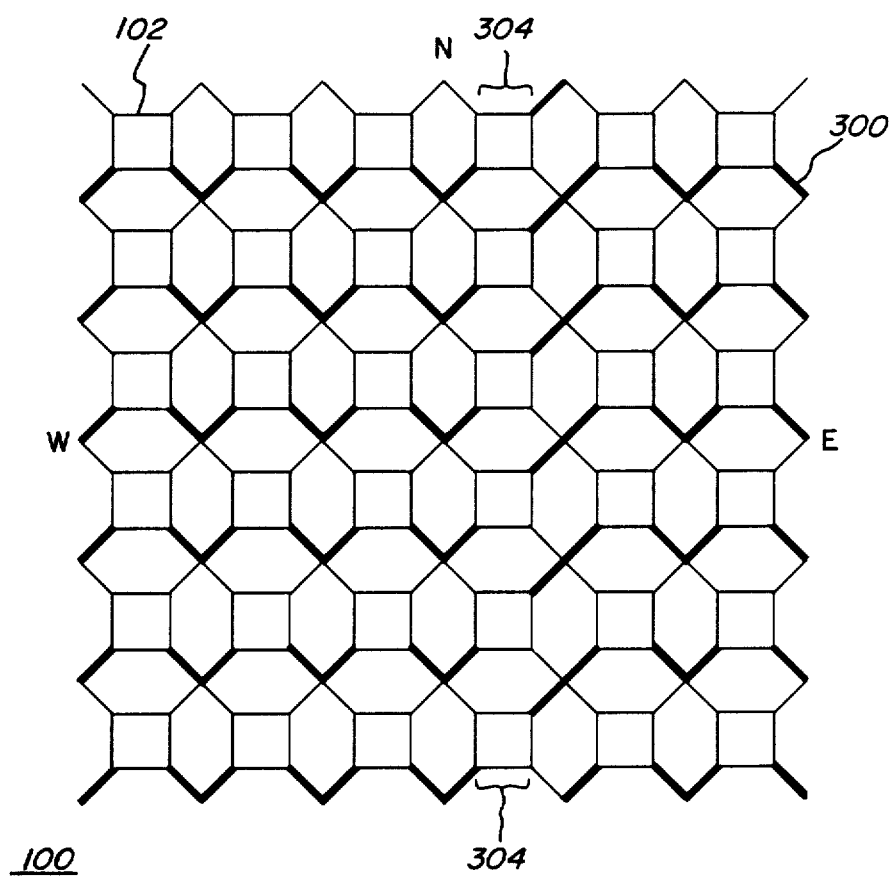

Referring to FIG. 6, for east to west signal propagation, a row shift is illustrated in which each element in a column 304 of the processing element array receives data signals on its northeast port instead of its southeast port. As in the case illustrated in FIG. 5, this also results in the formation of the elements into a single loop. In the toroidal cellular space. This is accomplished by preconditioning transposer 232 in each element in column 304 to transpose the data signals applied thereto. The transposers of all other elements in the system are not preconditioned. In all processing elements in the system, the read multiplexer, operating in accordance with the instruction signal, applies the data signal on its input 226 to the function generator. However, transposer 232, in each element in column 304, by transposing the signals applied thereto, applies the data signal received on the northeast port, rather than the data signal received on the southeast port, to read multiplexer input 226.

Figure 7:
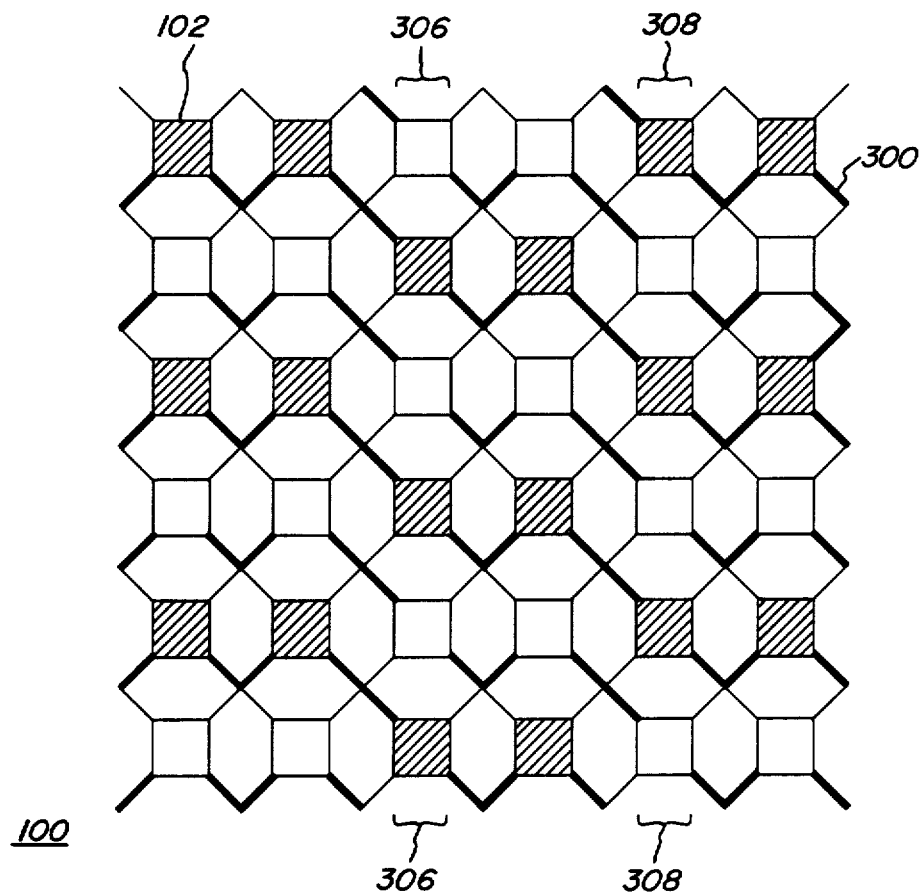

Other configurations of elements may be formed where row shifts are effected in more than one column in the array of elements. Referring to FIG. 7, for west to east data signal propagation, each element in columns 306 and 308 receives data signals on its northwest port instead of its southwest port. As a result, two disjoint loops of elements are formed in the toroidal cellular space, the illustration of this result being enhanced in FIG. 7 by shading the elements in one of the two loops.

With respect to FIGS. 4-7, unshifted data signal propagation along rows occurs between the southeast and southwest ports of each element 102. Unshifted data signal propagation along rows may also be effected between the northeast and northwest ports of the elements in either the east to west or west to east directions. In these latter cases (not illustrated herein), it is readily apparent that rows shifts similar to those described above may be accomplished by preconditioning the appropriate transposer in each element of one or more columns of the array.

Figure 8:
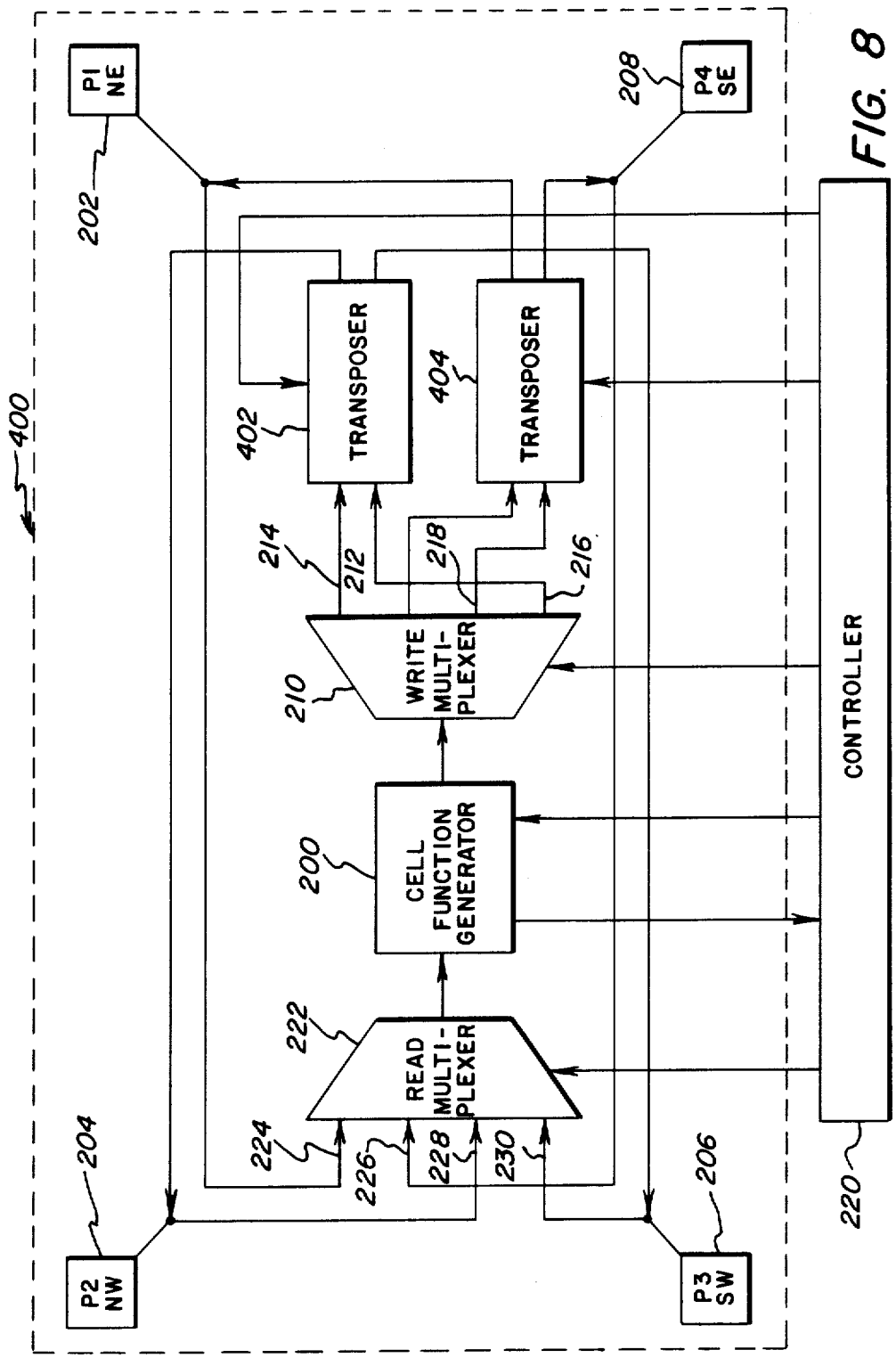
FIG. 8 illustrates the processing element of an alternate embodiment of the present invention.

In an alternate embodiment of the present invention, one or more transposes may be coupled between the communication ports and write multiplexer 210, rather than between the ports and the read multiplexer as described hereinabove. FIG. 8 illustrates an element 400, to be substituted for element 102 in system 100 in the alternate embodiment, in which two transposers are coupled between the outputs of the write multiplexer and the ports. But for the location of the transposers, the devices comprising element 400 are identical to those comprising element 102 and therefore have like reference numerals applied thereto. Element 400 includes a first transposer 402 coupled to outputs 214 and 216 of write multiplexer 210 and a second transposer 404 coupled to write multiplexer outputs 212 and 218. Transposers 402 and 404 are each constructed substantially identically to the transposer illustrated in FIG. 3 and operate in a substantially identical manner.

In operation, in the absence of data signal transposition by either transposer, a write address selecting write multiplexer output 212, 214, 216 or 218 is effective to cause the output data signal provided by function generator 200 to be transmitted on port 202, 204, 206 or 208, respectively. As a result, effecting a data signal transposition in transposer 402, enables transmitting a data signal on port 204 (the northwest port) instead of port 206 (the southwest port) and vice versa. Similarly, data signal transposition in transposer 404 enables transmitting a data signal on port 202 (the northeast port) instead of port 208 (the southeast port) and vise versa. Thus, by operation of either transposers 402 or 404 in the elements of one or more selected columns of system 100, it is possible to effect the row shifts illustrated in FIGS. 5-7 above.

While the data signal propagation along element rows has been illustrated herein, the invention is not so limited. The orientation of the array illustrated in FIGS. 1, 4, 5, 6 and 7 is relative so that by rotating those figures 90°, the rows therein may be viewed as columns. However, with respect to the array as illustrated, the transposers in elements 102 are connected, to pairs of ports exclusive of one another, to effect transpositions between data signals received on the northeast and southeast ports or the northwest and southwest ports. Should additional transpositions be desired to effect column shifts in data signal propagation along columns, rather than rows, additional transposers would be required in each element to transpose data signals received on the northwest and northeast ports as well as on the southwest and southeast ports. Generally, a transposer may be applied to any pair of inputs to the read multiplexer, and/or any pair of write multiplexer outputs, should such application have utility in the operation of system 100.

The transposition of the data signals received by elements in an entire column is preferred herein. However, any pattern of elements in the array may be preconditioned to effect shifts in data signal propagation as desired.

While the processing element disclosed herein includes two transposers, the invention is not so limited. Alternatively, the elements may each include only one transposer. For example, where only west to east data signal propagation along rows is needed, each element 102 need only include transposer 234. Similarly, in the alternate embodiment, for west to east propagation only, each element 400 need only include transposer 404.

The number of elements comprising system 100, as illustrated in the Figures, is selected to be small in order to facilitate the description of the present invention. In practice, however, the array may comprise a substantially greater number of elements, the number of elements having no effect on the practice of the present invention.

As described above, it is preferred herein that the preconditioning signal be computed by the element function generator for storage in register 254. The invention is, however, not so limited. Where the present invention is practiced with processing elements having dedicated memory available thereto, the preconditioning logic "1" signal may be stored, in advance, at a preselected address in the respective memories of elements in which it is desired to transpose received signals. Then, during system operation, when it is desired to effect the signal transposition, all elements are instructed, by the controller, to transfer the information from the preselected memory address to register 254. As a result, only those elements for which the preconditioning signal was stored in advance, will be enabled to subsequently effect the desired transposition.

The transposer illustrated herein includes terminals for receiving signals. Such terminals are included herein merely to facilitate description of the present invention. In practice, the portion of the processing element, including the transposers, disclosed herein may be integrated onto a circuit chip including other devices which, while not pertinent to the practice of the present invention, are nonetheless necessary components of the elements. In such a case, the devices illustrated herein may be either directly connected to other devices on the element chip or to input/output terminals of the chip.

While a preferred embodiment has been illustrated and described herein, it will be obvious that numerous modifications, changes, variations, substitutions and equivalents, in whole or in part, will occur to those skilled in the art without departing from the spirit and scope contemplated by the invention. Accordingly, it is intended that the invention herein be limited only by the scope of the appended claims.

What is claimed is:

1. A processing element for use in a distributed processing system, comprising:
    a plurality of communication ports for transmitting and receiving data signals, each port having a unique identifying address;
    means for processing input data signals received on the ports and for providing output data signals to the ports;
    first directing means, responsive to an externally generated write control signal, for directing an output data signal from said processing means to a first selected one of said ports, said first port being selected by said first directing means according to a first address provided by the write control signal;
    second directing means, responsive to an externally generated read control signal, for directing an input data signal received on a second selected one of said ports to said processing means, said second port being selected by said second directing means according to a second address provided by the read control signal; and
    first transposing means, responsive to a first preconditioning signal, for transposing the data signals of a first predetermined group of ports selected by one of said directing means, said first transposing means being coupled between one of said directing means and at least one of said communication ports.

2. The processing element of claim 1 wherein said write and read control signals are included in an instruction signal applied to said element.

3. The processing element of claim 1 further comprising second transposing means, responsive to a second preconditioning signal, for transposing the data signals of a second predetermined group of ports selected by said one directing means.

4. The processing element of claim 3 wherein the ports in said first group of ports are exclusive of the ports in said second group of ports.

5. The processing element of claim 4 wherein there are four of said communication ports; and
    said first and second groups of ports each have two ports.

6. The processing element of claim 3, wherein said one directing means comprises the second directing means, and wherein the data signals transposed by the first transposing means are input data signals and the first transposing means is operative to alter the input data signals to the processing means which are selected by the second directing means.

7. The processing element of claim 6, wherein the second directing means comprises a read multiplexer having a separate input terminal coupled to each of said ports and having means for selecting an input data signal on one of said input terminals for output to the processing means, and wherein said first and second transposing means are interposed between said first and second groups of ports and said input terminals of the read multiplexer, each of said transposing means having means for transposing the couplings between the ports of its group and a corresponding number of input terminals of the read multiplexer so as to alter the port selected by the second address.

8. The processing element of claim 3, wherein said write control signal, said read control signal, and said first and second preconditioning signals are generated by an external controller operating under program control.

9. The processing element of claim 1 wherein there are four of said communication ports.

10. The processing element of claim 1, wherein said first transposing means is further responsive to an externally generated first transpose control signal; and
    said first transposing means comprises:
        memory means for storing said first preconditioning signal;
        logic means, coupled to receive the first preconditioning signal stored in said memory means and said first transpose control signal, for providing an output signal upon receiving said first transpose control signal while said first preconditioning signal is stored in said memory means; and
        multiplexing means for transposing the data signals of said first group of ports upon receiving said logic means output signal, said multiplexing means providing the transposed data signals.

11. The processing element of claim 7 further comprising:
    second transposing means, responsive to a second preconditioning signal, for transposing the data signals of a second predetermined group of said ports selected by said one directing means; and wherein
    said second transposing means is substantially identical to said first transposing means.

12. The processing element of claim 11, wherein said element has four of said communication ports, said first and second groups of ports each consisting of two ports and that the ports in said first group being exclusive of the ports in said second group; and wherein
    said one directing means comprises a multiplexer coupled to the four ports and to said first and second transposing means, said multiplexer having means for coupling said processing means to one of said four ports via said first and second transposing means.

13. The processing element of claim 1 wherein said processing means comprises means for providing said first preconditioning signal.

14. The processing element of claim 1, wherein said one directing means comprises the first directing means, and the first transposing means is operative to alter the selection of the input data signal to the processing means.

15. A processing element for use in a distributed processing system, comprising:

a plurality of communication ports for transmitting and receiving data signals, each port having a unique identifying address;

means for processing the data signals;

first directing means, coupled to said ports and to said processing means and responsive to a write control signal, for directing an output data signal provided by said processing means to a first selected one of said ports, said first port being selected by the first directing means according to a first address provided by said write control signal;

second directing means coupled to said ports and to said processing means and responsive to a read control signal, for directing an input data signal received on a second selected one of said ports to said processing means, said second port being selected by the second directing means according to a second address provided by said read control signal; and first transposing means, responsive to a first preconditioning signal, for transposing the couplings between one of said data signal directing means and a first predetermined group of said ports, said first transposing means being coupled between one of said directing means and at least one of said communication ports.

16. The processing element of claim 15 further comprising second transponding means, responsive to a second preconditioning signal, for transposing the couplings between said one data signal directing means and a second predetermined group of said ports.

17. The processing element of claim 16 wherein the ports in said first group of ports are exclusive of the ports in said second group of ports.

18. The processing element of claim 17 wherein there are four of said communication ports; and said first and second groups of ports each have two ports.

19. The processing element of claim 11, wherein said first transposing means is further responsive to an externally generated first transpose control signal; and said first transposing means comprises:

memory means for storing said first preconditioning signal;

logic means, coupled to receive the first preconditioning signal stored in said memory means and said first transpose control signal, for providing an output signal upon receiving said first transpose control signal while said first preconditioning signal is stored in said memory means; and multiplexing means for transposing the data signals directed by said one data signal directing means upon receiving said logic means output signal, the transposed data signals being data signals transmitted or received on the ports of said first group of ports.

20. The processing element of claim 19 further including:

second transposing means, responsive to a second preconditioning signal, for transposing the couplings between said one data signal directing means and a second predetermined group of said ports; and said second transposing means being substantially identical to said first transposing means.

21. The processing element of claim 20, wherein said element has four of said communication ports, said first and second groups of ports each consisting of two ports, none of the ports in said first group being included in said second group; and said first data signal directing means comprises a multiplexer having an input for receiving the output data signal of said signal processing means and having four outputs coupled to said first and second transposing means, said multiplexer having means for providing the output data signal of said signal processing means on one of said multiplexer outputs which is coupled to a port identified by the address provided by said write signal.

22. The processing element of claim 15, wherein said processing means has means for providing said first preconditioning signal.

23. The processing element of claim 15, wherein said one data signal directing means comprises the first directing means, and the first transposing means is operative to alter the ports selected by the write control signal for the output data signal from the processing means.

24. The processing element of claim 15, wherein said one data signal directing means comprises the second directing means, and the first transposing means is operative to alter the port selected by the read control signal for the input data signal to the processing means.

25. A processing element for use in a distributed processing system, comprising:

a plurality of ports for transmitting and receiving data signals, each port having a unique identifying address;

means for processing a data signal;

a write multiplexer connected to an output of the processing means and to each of the ports, the write multiplexer having means responsive to a first address for routing the output of the processing means to a port identified by the first address;

a read multiplexer having an input terminal for each of the ports and having an output terminal connected to an input of the processing means, the read multiplexer having means responsive to a second address for connecting the input terminal thereof corresponding to a port identified by such second address to the output terminal for supplying a data signal on the selected input terminal to the processing means; and transposing means disposed between the input terminals of the read multiplexer and the ports for transposing connections between the ports and the input terminals so as to alter the port connected to the selected input terminal of the read multiplexer by the second address and alter the data signal input to the processing means.

* * * * *